United States Patent [19]

Beck

[11] 4,144,372
[45] Mar. 13, 1979

[54] LOW-DENSITY SPACE-FILLING SHEET MATERIAL

[75] Inventor: Warren R. Beck, Saint Paul, Minn.

[73] Assignee: Minnesota Mining and Manufacturing Company, Saint Paul, Minn.

[21] Appl. No.: 826,058

[22] Filed: Aug. 19, 1977

Related U.S. Application Data

[63] Continuation-in-part of Ser. No. 544,965, Jan. 29, 1975, Pat. No. 4,111,713.

[51] Int. Cl.² .................................................. B32B 5/16
[52] U.S. Cl. .............................. 428/283; 106/288 B; 106/40 V; 428/323; 428/325
[58] Field of Search ....................... 428/323, 325, 283; 106/288 B, 40 V

[56] References Cited

U.S. PATENT DOCUMENTS

| 2,567,233 | 9/1951 | Palmquist et al. | 428/325 |
|---|---|---|---|
| 3,449,201 | 6/1969 | Palmquist et al. | 428/325 |
| 3,875,273 | 4/1975 | Martin | 264/43 |
| 3,915,771 | 10/1975 | Gatzke et al. | 428/325 |
| 3,978,269 | 8/1976 | Martin | 428/404 |
| 4,013,810 | 3/1977 | Long | 428/325 |

Primary Examiner—Winston A. Douglas
Assistant Examiner—J. V. Howard
Attorney, Agent, or Firm—Cruzan Alexander; Donald M. Sell; Roger R. Tamte

[57] ABSTRACT

Sheet material useful, among other ways, as a low-density space-filling strata in layered structures such as glass-fiber-reinforced molded polymeric articles, comprising a flexible carrier web and a monolayer of uniformly sized discrete low-density filler bodies adhered to the carrier web.

17 Claims, 9 Drawing Figures

LOW-DENSITY SPACE-FILLING SHEET MATERIAL

REFERENCE TO RELATED APPLICATION

This application is a continuation-in-part of my copending application Ser. No. 544,965, filed Jan. 29, 1975, now U.S. Pat. No. 4,111,713.

INTRODUCTION

The present invention provides a new kind of sheet material for use as a filler or core structure especially in molded or laminated polymeric products. The new sheet material provides many of the features provided by honeycomb core structures,—e.g. a combination of low-density, strength, and rigidity in products incorporating the sheet material—; but in addition the new sheet material provides features and uses not available with conventional honeycomb and which open the way to major improvements in the molded product industry.

Briefly, this new space-filling sheet material comprises a flexible carrier web and a dense monolayer of low-density filler bodies adhered to at least one side of the carrier web. The filler bodies are discrete or separate from one another so that the carrier web can readily flex between the filler bodies, and the filler bodies are of a uniform size to provide the sheet material with a uniform thickness and uniform properties. Hollow spheres, generally between about 1 and 20 millimeters in diameter, are greatly preferred as the filler body. Such spheres provide a high-strength, low-density molded product; are conveniently arranged in a densely packed monolayer in sheet material of the invention; and leave the sheet material with good flexibility.

Flexibility is an important advantageous property of sheet material of the invention. This flexibility can permit the sheet material, for example, to be draped over surfaces of compound curvature in ways that other low-density fillers such as honeycomb or balsa wood could never be handled. Other advantages include ease of cutting to fit a particular shape, ready ability to vary the modulus or rigidity of the molded product, and wide adaptability to a range of matrix or binder systems in which the sheet material is incorporated. All of these advantages can lead to improved techniques for preparing molded products and to new forms of molded products, providing economies in processing and lower costs of finished goods as well as new and improved properties in the molded products.

DETAILED DESCRIPTION

A preferred kind of hollow sphere for use in the present invention is taught in my copending application Ser. No. 544,965, filed Jan. 29, 1975. These spheres are formed by tumbling solidifiable liquid globules of binder material in a mass of minute solid discrete free-flowing particles. The particles serve as a parting agent during the tumbling action, keeping the globules separate from one another, and becoming at least partially absorbed into the globules. As the tumbling proceeds, the globules are first converted to a hollow, generally spherical condition by the action of a volatile void-forming agent in the binder material, and are then solidified.

The resulting hollow spheres have a solidified seamless exterior wall that carries at least on its exterior surface partially embedded, partially protruding parting agent particles, and usually is filled throughout at least a major portion of its thickness by parting agent particles. The exterior wall of the spheres comprises a single thickness of binder material (which may include two or more ingredients in mixture) and the parting agent particles. At least some of the parting agent particles in the wall are partially embedded in the wall and partially exposed whereby they form the exterior surface of the sphere that contacts adjacent spheres in the mass of spheres formed by the operation. In most spheres of the invention the exterior wall of the sphere is also filled throughout at least a portion of its thickness by the parting agent particles.

Figure 1:
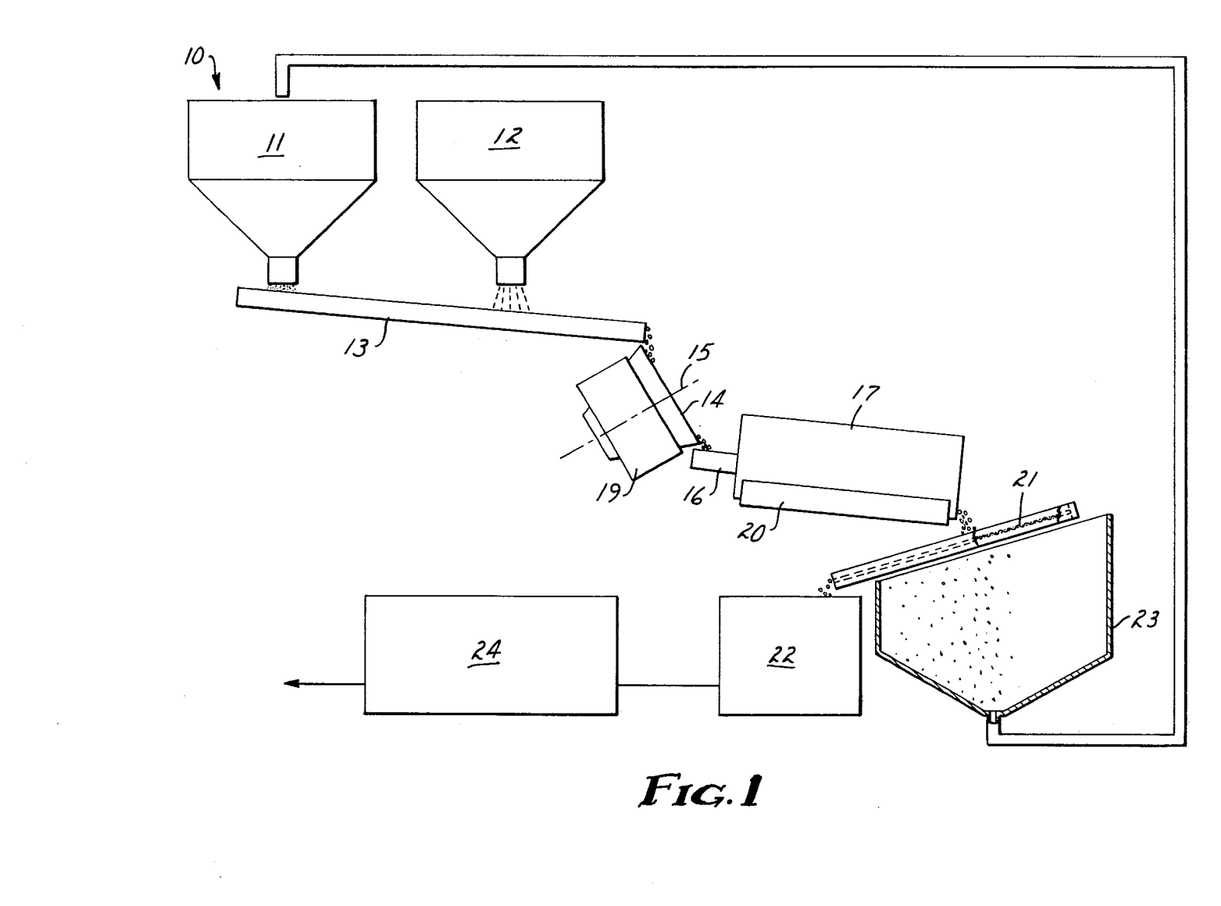
FIG. 1 is a schematic diagram of illustrative apparatus for forming hollow spheres in sheet material of the invention.

FIG. 1 is a schematic diagram of illustrative apparatus 10 that may be used to carry out the described method for preparing preferred hollow spheres. This apparatus includes a hopper 11 into which parting agent particles are introduced and a hopper 12 into which solid granules of binder material containing a volatile void-forming agent are introduced. The parting agent particles and binder material granules are metered from the hoppers 11 and 12 into a trough 13 located beneath the hoppers. Alternatively the hopper 12 may be replaced with apparatus to meter liquid droplets onto a bed of parting agent particles in the trough 13. For best results a rather thin bed of parting agent particles is moved along the trough 13 to prevent deformation of the spheres that are to be ultimately formed. Depending on the density of the material being processed, the bed is usually between about 1 to 10 centimeters in depth, but it may vary outside this range under some circumstances.

From the trough 13 the parting agent particles and binder material granules travel in the illustrated apparatus to an inclined truncated-cone-shaped pan 14 which rotates about an axis 15 and which serves as a balling pan; then overflow into a trough 16; and then move into a cylindrical sphere-rolling or maintaining container 17 which rotates about its cylindrical axis 18 and in which the final hollow sphere formation takes place. The balling pan 14 may be omitted if the material being fed will initiate sphere-formation in the cylindrical container 17. Also the parting agent particles and binder material granules may be added directly to the balling pan rather than being fed into a trough. Preferably, the inside surface of the cylinder 17 is roughened, as with a coating of particles. One or both of the balling pan 14 and cylindrical container 17 are generally heated, as by flame, by an electric furnace, or by the illustrated heating blankets 19 and 20, to melt solid binder material granules to a liquid globule form. Heat may also be used to maintain a desired viscosity; to evaporate solvent; to activate blowing agent within the binder material granules; and to ultimately advance reactive binder material globules to solidified form.

As the mixture of parting agent particles and binder material granules is tumbled inside balling pan 14 or the cylindrical container 17 and the granules melt, the void-forming agent vaporizes and causes a void to form in the liquid globules. Usually, but not necessarily, this void formation is accompanied by expansion in size of the globules. Further, the parting agent particles are wetted by liquid globules and become at lest partially drawn into the globules. As the tumbling process continues, more and more parting agent particles may become absorbed into the globules.

At the same time, the liquid globules of binder material are hardening, as by a crosslinking reaction, by evaporation of solvent, or by cooling. The desired temperature within the sphere-forming cylinder 17 and length of travel through the cylinder is varied according to the materials used, depending on the melting point, melt viscosity, and reaction rate of the binder material; the ease of wetting of parting agent particles; the activity and amount of blowing agent; and the desired size of hollow spheres. Eventually a mixture of solidified hollow spheres and unabsorbed parting agent particles reaches the end of the cylinder 17 and drops onto a screen 21. The hollow spheres that have been prepared move along the screen 21 into a container 22, and excess parting agent particles drop through the screen into a second container 23 from where they may be reintroduced into the hopper 11. Depending on the nature of the hollow spheres, they may be subjected to further treatment, as by passing them through an oven 24 to postcure the binder material of the spheres.

Instead of apparatus as illustrated, which is adapted to a continuous process, the parting agent particles and either solid granules of liquifiable binder material or already liquid globules of binder material may be introduced directly into a single conical pan, where they are tumbled together to form useful hollow spheres. Generally a single batch is formed in such an apparatus; however continuous processing can also be performed, since the larger and lighter hollow spheres, when formed, tend to roll to the top and to the outer edge of the pan which is moving faster because of its greater circumference.

For smaller batches, a spherical flask having a tubular inlet can be used. The flask is filled with a mixture of parting agent particles and granules or globules of binder material, after which the flask is closed and attached to a shaft which rotates it about the axis of the tubular inlet. Such an appartus has been found to allow an excellent control on temperature and rolling action.

Other apparatus besides rotating containers can also be used to accomplish tumbling and mixing of liquid globules of binder material and parting agent particles. Any means in which the liquid globules are agitated freely in a mixture of parting agent particles can be used. For example, a mixture of globules and parting agent particles can be vibrated in a flat bed. Such a means is particularly useful with smaller-sized globules.

A wide variety of binder materials may be used to form hollow spheres for use in the invention. More than one ingredient can be included in the binder material, although these ingredients will generally be dissolved or uniformly dispersed in one another. The result is that in a hollow sphere formed at the end of the described sphere-forming operation and solidification of the binder material, the spherical wall of the sphere comprises only a single layer or thickness of the binder material, plus parting agent particles at least partially embedded in the layer or wall. There may be a gradation in the composition of the layer from one edge to the other edge; and there may be pigments, flow-control agents, fire-retarding agents, or other fillers (besides the parting agent particles) contained in the binder material as a discontinuous phase or dispersion. But the wall is a single-layer wall formed as a void develops in the liquid globule of binder material.

Illustrative organic ingredients of binder materials useful in the described hollow spheres include epoxy resins; polycarbodiimides; formaldehyde resins such as phenol-formaldehydes, urea-formaldehydes, and melamine-formaldehydes; polyesters; polyisocyanurates; polyurethanes; natural rubber and synthetic elastomers, such as silicones, styrene-butadiene copolymers, chloroprenes, acrylonitrile-butadiene copolymers; acrylic resins; ethylene copolymers such as ethylene-vinyl acetate copolymers; propylene copolymers such as ethylene-propylene copolymers; and olefin-wax combinations. These materials may variously be formulated to solidify, as by polymerization, by crosslinking, by loss of volatiles, or by cooling. Properties of the solidified binder material may vary, e.g. from flexible or elastomeric, to rigid.

Inorganic binder materials such as the low-melting glass described in U.S. Pat. No. 2,863,782 may also be used. Glass-forming binder material granules may be provided as spray-dried "slip" particles, prepared as in glaze or enamel preparation, which simplify incorporation of a volatile void-forming agent. In the case of inorganic ceramic or metal parting agents, the binder material may be a low-cost flux (such as sodium carbonate, sodium borate, or sodium silicate) and may be in the form of a water solution thickened to the proper viscosity with a material such as sodium alginate. This thickener acts as a temporary binder material prior to sintering the principal binder material.

During the sphere-forming operation the binder material should achieve a viscosity that is low enough for the parting agent particles to be wetted by the globules, and preferably low enough so that any cells forming inside an evacuated globule will tend to at least partially coalesce, whereby binder material will be concentrated at the exterior spherical wall or shell of the sphere. At the same time the viscosity of the binder material should be high enough so that the expanded globule will not deform excessively while sphere-formation is taking place. The useful range of viscosities for the binder material is broad, ranging from at least about 50 to 100,000 centipoises, but an especially preferred range is between about 100 and 10,000 centipoises. The globules of binder material in the tumbling, sphere-forming operation are termed liquid herein, since even when at high viscosity they are flowable. The range of useful viscosities will vary with particle size and the ease with which the parting agent particles can be wet. Surfactants can be used to advantage either as an ingredient in the binder material or as a treatment on the parting agent particle.

In general any solid discrete free-flowing particulate material, which is sufficiently inert (including sufficiently non-melting) to retain its parting function throughout the sphere-forming operation, can be used as a parting agent particle. Examples of useful parting agent particles are hollow or solid glass microspheres; byproduct fines (fine particles obtained as a byproduct from some industrial or mineral operation, including combustion, abrading, crushing, mining, refining, and milling operations); ground scrap rubber particles such as vulcanized scrap rubber from tires; hard irregular abrasive particles (called "abrasive granules" herein) such as aluminum oxide granules used for abrasive products; magnetic iron oxide particles; perlite; clay; glass fibers or glass flakes; wood flour; flame-retardants such as aluminum trihydrate; organic polymeric particles; and metal particles. Mixtures of any of the above-mentioned particles may be used. For example, parting agent particles providing better flow properties may be mixed with irregular parting agent particles (high-flow silicia particles are especially useful with irregular elastomeric particles, for example); or mixtures may be used to provide pigmentation, flame-retardancy, or variety in physical properties of the final sphere. Generally the parting agent particles will range from a few micrometers up to several hundred micrometers in size. They generally have a diameter no larger than the thickness of the wall of the final hollow sphere.

Hollow glass microspheres have the advantages of low-density, inertness, relatively low cost, impermeability, and perfect sphericity. Sphericity permits the parting agent to be packed very closely and thus minimizes the binder material needed in the spheres. Solid glass microspheres are another spherical parting agent particle, and fly-ash particles can be obtained in spherical form.

The void-forming agent used to form hollow spheres of the invention can be any substance which, while present in the binder material, evolves as a gas during the time and at the temperature of formation of the hollow spheres. It may be a separate ingredient added to the binder material; it may be a byproduct of reaction of the binder material; or it may be a solvent or carrier for the binder material. Often the void-forming agent is incorporated into the binder material while the latter is in liquid form prior to being solidified and formed into granules. In other cases it is mixed with milled solid binder material which is then spray-dried or compressed or otherwise prepared into granules.

Most often the void-forming agent causes an expansion in size of the liquid globules being formed into hollow spheres, since at least initially the outer wall of the globule tends to retain evolved gas. Sufficient void-forming agent is provided to form voids of the desired size. Examples of useful void-forming agents are: in the case of polycarbodiimide, a carbon dioxide reaction product of curing of the polycarbodiimide; in the case of some elastomers, a solvent for the elastomer precursor; and in the case of low-melting glass, water from hydrated borate or water contained in other "slip" particles.

The granules or globules of binder material introduced into the sphere-forming apparatus will vary in size depending upon the size of hollow sphere that is ultimately desired. Typically the granules are between about 100 micrometers (microns) and 1 centimeter in diameter, and most often are less than 5 millimeters in diameter.

Generally binder material granules in such a range of sizes produce hollow spheres about ½ millimeter to 2 centimeters in diameter. Spheres can be made by the described method with good uniformity of sizes by using binder material granules or globules of uniform size. Further, of course, hollow spheres may be screened after formation to provide desired ranges of sizes.

Figure 2:
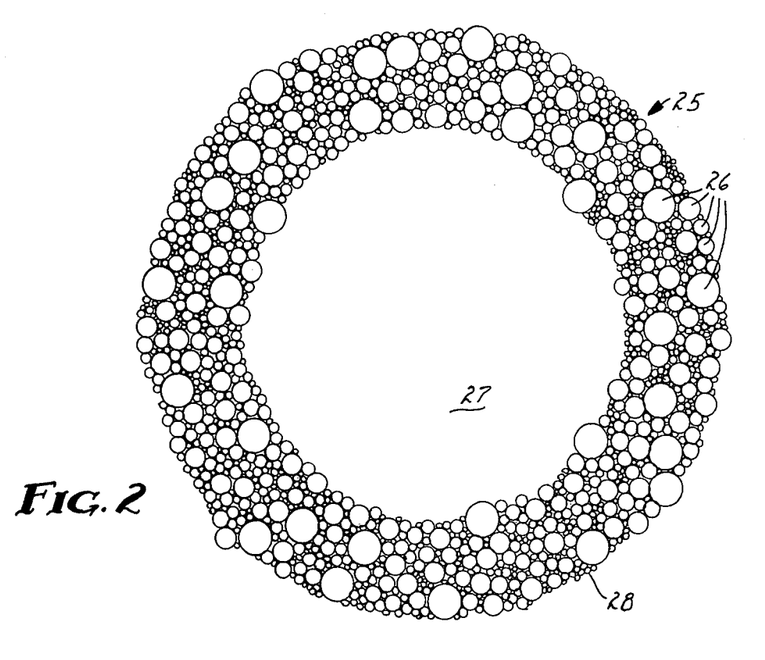
FIG. 2 is an enlarged cross-section through an illustrative hollow sphere as prepared by apparatus shown in FIG. 1.
Figure 3:
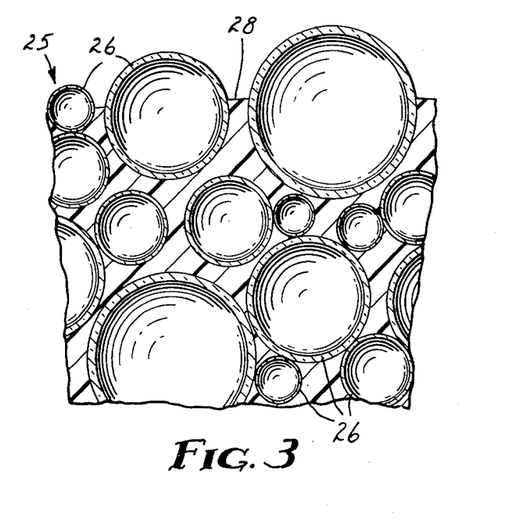
FIG. 3 is a fragmentary view of an edge-portion of the sphere shown in FIG. 2, greatly enlarged over the scale of FIG. 2.

FIG. 2 illustrates, in enlarged cross-section, a hollow sphere 25 in which the parting agent particles are hollow microspheres 26. In this sphere, the hollow microspheres have penetrated and filled the whole wall of the sphere, and the outer microspheres are only partially embedded in and partially protrude from the spheres. By capillary action, binder material may creep up the sides of exterior parting agent particles. Spheres useful in the present invention are generally round but need not be perfectly spherical; they may be cratered or ellipsoidal, for example. Such irregular, though generally round or spherical, hollow products are regarded as "spheres" herein.

The hollow spheres formed by the described method preferably have a single hollow interior space, such as the space 27 of the space 25, enclosed by a single spherical wall or shell 28, but the interior space in the hollow sphere may also be divided into a number of cells by interior walls having essentially the same composition as the exterior wall; but even such spheres have an outer wall, usually of rather constant thickness and of greater density, around the interior space. The outer wall is continuous and seamless (that is, without the junction lines resulting when two separately molded hemispheres are bonded together), and for use in space-filling sheet material of the present invention is preferably impermeable to polymeric matrix material by which the spheres are surrounded during a molding operation. The thickness of the outer wall is generally less than about ½ the radius of the sphere and may be quite thin, as thin as 1/50 the radius, for example.

Most often the parting agent particles fill the entire thickness of a wall or shell of a hollow sphere prepared by the described method. However, if the cure rate or solidification rate of the spheres is quite rapid, or the viscosity of the binder material during the sphere-forming operation is quite high, or the parting agent particles have surface properties that make them difficult to wet, the parting agent particles may be absorbed only part way into the outer wall of the sphere. Even in such cases, the parting agent particles will usually fill at least a major portion (on the order of 50 percent or more) and preferably at least 75 percent of the thickness of the outer shell.

Figure 4:
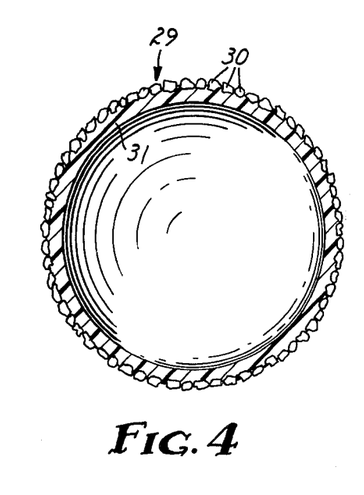
FIG. 4 is an enlarged cross-section through a different hollow sphere useful in sheet material of the invention.

The outer parting agent particles incorporated in the hollow sphere will be only partially embedded in and will partially protrude (usually at least 50 percent) from the exterior wall of the hollow sphere. In this way the outer parting agent particles form the exterior surface of the spheres that contacts other spheres in the formed mass of spheres. The spheres are thus, at least for the most part, kept separate from one another. In some cases, spheres prepared by the described method have only an outer layer of parting agent particles partially embedded in, and partially protruding from, the exterior wall of the sphere. Such a sphere 29 is illustrated in FIG. 4 and includes irregular parting agent particles 30 partially embedded in the wall 31 and partially exposed.

Figure 5:
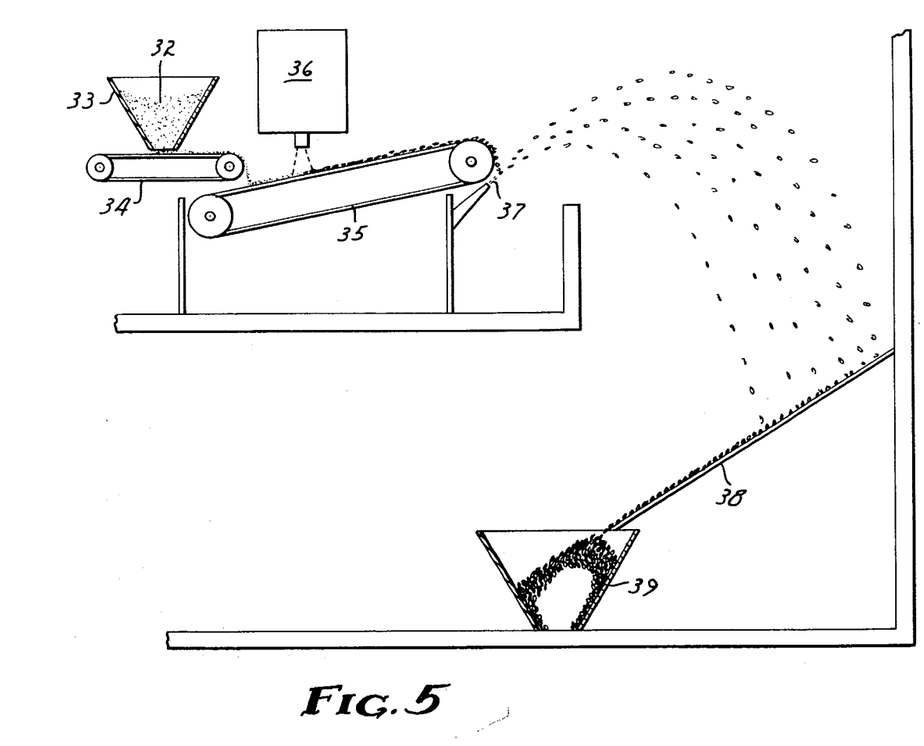
FIG. 5 is a schematic diagram of illustrative apparatus for sealing hollow spheres useful in sheet material of the invention.

The outer wall of spheres prepared by the described method may be sealed as by coating a liquid sealing resin onto the spheres. Such an operation is schematically illustrated in FIG. 5. As shown there, permeable hollow spheres 32 contained in a hopper 33 are cascaded onto a conveyor belt 34 and travel to a second conveyor belt 35. While on the conveyor belt 35, a sealing material (such as a 15-weight-percent solution of catalyzed epoxy compound in methylene chloride) is sprayed onto the spheres from a tank 36. The sprayed spheres are carried to a jet of air 37 which blows them upwardly into a free-falling stream where the sealing material solidifies. The stream of sealed spheres is caught on inclined surface 38 and collected into a container 39.

Besides coatings applied to seal them, spheres may be provided with other exterior coatings, including an adhesive material such as heat-activated adhesive by which the spheres can be later adhered to the carrier web of sheet material of the invention.

Other hollow spheres useful in the invention include spheres made by coating polymer on foamed polystyrene spheres and heating the coated spheres to solidify the resin. The polystyrene core spheres may or may not collapse during formation of the exterior solid layer. Spheres of syntactic foam such as described in Hinton, U.S. Pat. No. 3,669,912 may also be used, as may foamed glass pellets such as are available commercially from Pittsburgh-Corning as "Celramic" glass nodules, or foamed polymeric pellets such as uncoated polystyrene foam spheres. Elastomeric spheres such as prepared by procedures described above using ground rubber particles and elastomeric binder materials may also be used, as in fact may any low-density uniformly sized and shaped particle or granule.

For sheet material of the invention to function as a low-density space filler, the filler bodies should generally have a low density, e.g. an average true (rather than bulk) density less than 0.75 gram/cubic centimeter, and preferably, for most applications of sheet material of the invention, less than about 0.5 gram/cubic centimeter. Also, the closer the filler bodies are packed in the sheet material the lower the density of the final molded product. Generally, the centers of the filler bodies are spaced apart on the average by no more than 200 percent of their average diameter and preferably by no more than 150 percent. Spacings averaging no more than about 120 percent of their average diameter can be achieved and offer the lowest-density products.

The filler bodies should be uniformly sized and shaped to obtain uniform properties in a molded product. Generally, at least 90 weight-percent of the filler bodies have diameters (the largest dimension of the filler bodies) that are within plus-or-minus 25 percent, and preferably are within plus-or-minus 10 percent, of the average diameter of the filler bodies. For the best drapeability, and for most typical uses of sheet material of the invention, the filler bodies are less than about 10 millimeters in diameter.

The carrier web to which the filler bodies are adhered is preferably porous to allow liquified polymer-based matrix material, and any fillers in the matrix material, to flow through the carrier web during molding or laminating of articles that incorporate the sheet material and thereby fully surround the filler bodies. Porosity is often indicated by air permeability measurements such as described in ASTM D737. Carrier webs having an air permeability of 100 cubic feet per minute per square foot or even lower in the ASTM test can be practicably used, especially with matrix materials having small-diameter fillers. However, filler bodies can be quite adequately adhered to webs having an air permeability of 1000 cubic feet per minute per square foot or more, and such webs are usually preferred.

Fibrous materials, especially non-woven webs, are preferred carrier webs. Open-mesh woven fabrics, nettings and so-called fibrillated or multi-perforated films (see U.S. Pat. No. 3,137,746) can also be used. Elastomeric webs such as cloths or webs made with elastomeric fibers may also be used to give the carrier web greater flexibility.

Filler bodies can be adhered to the carrier web with adhesive, as by coating the web with a layer of adhesive that leaves the web still porous, and then cascading filler bodies onto the web while the adhesive is tacky. Alternatively, a normally non-tacky adhesive is coated on the filler bodies, and then activated once the filler bodies are in place on the filler web. Also, either the filler bodies or carrier web may be inherently adhesive upon proper activation. For example, non-woven webs of heat-activatable fibers are useful adhesives, though they are preferably used to adhere the filler bodies to an unsoftened carrier web. The adhesive may be non-curing (e.g. heat-activatable polyamide or polyester fibers for use in the noted non-woven adhesive webs, hot-melt polyvinyl alcohols, acrylates, and rubber latices); or may cure to a substantially infusible, insoluble state so as to better retain filler bodies in place during molding of an article (e.g. catalyzed epoxy, phenolics, or rubber latices).

Figure 6:
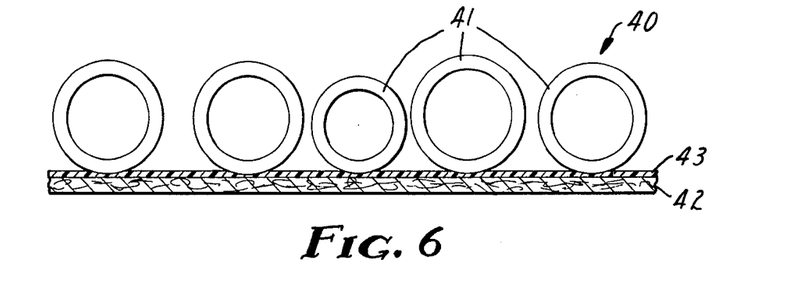
FIGS. 6 and 7 are cross-sectional views through representative sheet materials of the invention.
Figure 7:
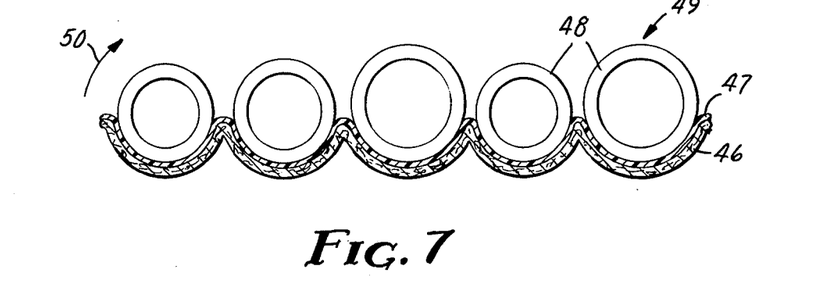

FIG. 6 shows a space-filling sheet material of the invention 40 in which hollow spheres 41 are adhered to a carrier web 42 by a layer of adhesive 43. To maintain the greatest flexibility in at least one direction about axes lying in the plane of the carrier web, the filler bodies are contacted over no more than about one-fourth their total surface area by adhesive or carrier web. However, in other embodiments, as shown in FIG. 7, the carrier web 46 and adhesive 47 are conformed hemispherically to the sides of the filler bodies 48. Such an arrangement gives the sheet material 49 greater flexibility in the second direction (i.e. the direction of the arrow 50) about axes lying in the plane of the sheet material, and is especially useful with larger-diameter filler bodies.

A sheet material of the invention is generally sufficiently flexible so that is can be wound into a compact storage roll and marketed as roll goods. Most often, the sheet material is more flexible than that, offering the previously described drapeability that is of advantage in molding articles of complex shape. The sheet material will typically drape (in at least its easy-bening direction) over a mandrel having a diameter equal to the average diameter of the filler bodies; and it is drapeable in this way about any axis lying in the plane of the carrier web.

Figure 8:
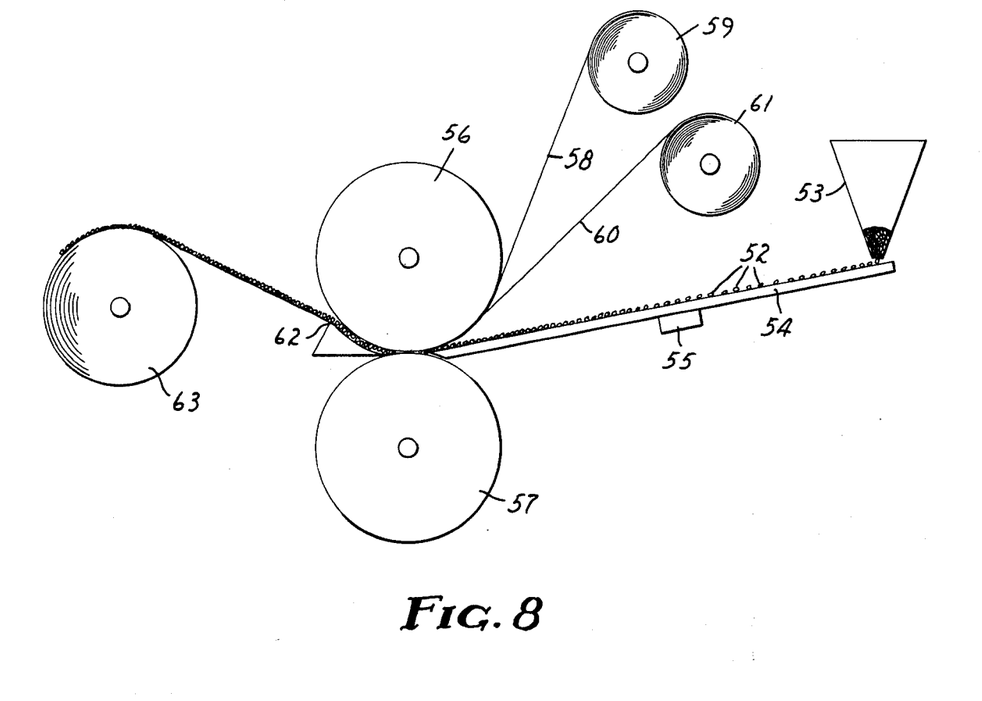
FIG. 8 is a schematic diagram of illustrative apparatus for preparing sheet material of the invention.

One method for preparing sheet material of the invention is shown in FIG. 8. Filler bodies 52 are fed from a hopper 53 onto a deck 54 which is vibrated by vibrator 55 to cause the filler bodies to form a closely packed layer. The deck 54 is inclined so that the layer of filler bodies is conveyed into the nip between two rollers 56 and 57 together with a carrier web 58 unwound from supply roll 59 and adhesive web 60 unwound from supply roll 61. The rollers 56 and 57 are typically heated, so that the web 60 of adhesive is softened and the filler bodies 52 wetted by the adhesive. A pressure pad 62 holds the assembly of filler bodies, carrier web, and adhesive web together until the adhesive solidifies, as by cooling (which may be assisted by blowing cool air onto the assembly in the area of the pressure pad) or curing. Finished product is wound in storage roll 63.

In one modification of the illustrated process, a solvent-based, molten, or otherwise liquid adhesive is printed on the carrier web prior to introduction of the web between the rolls 56 and 57 instead of using a non-woven adhesive sheet.

Figure 9:
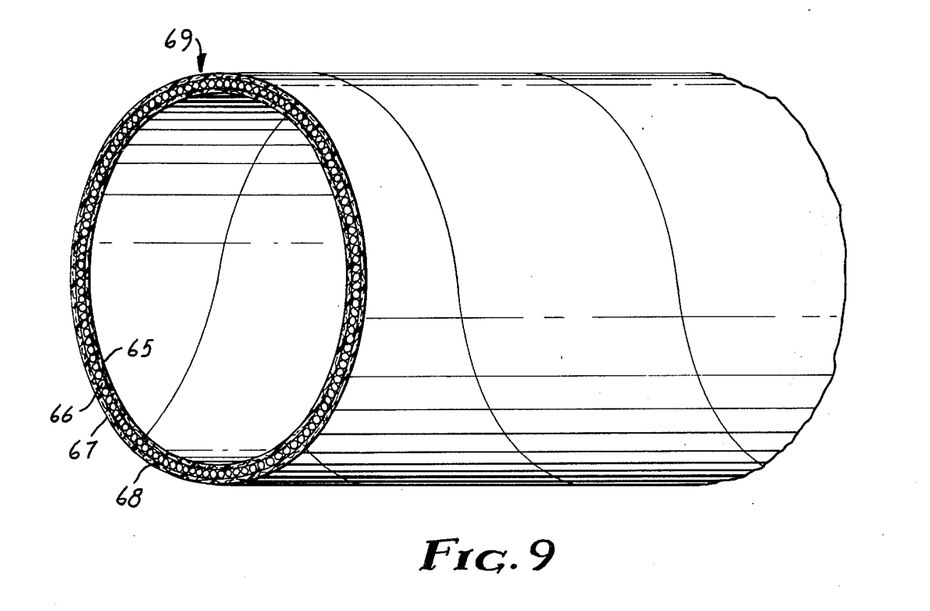
FIG. 9 is a perspective sectional view showing a portion of pipe which incorporates sheet material of the invention.

Some of the uses to which sheet material of the invention can be put include stiffened, thin, molded products such as boats, shower stalls, machinery housings, helmets, and furniture. FIG. 9 shows pipe prepared from sheet material of the invention. In making one representative pipe, glass fiber mat or cloth 65 is spirally wound on a mandrel; sheet material 66 of the invention is spirally wound over the glass fiber mat or cloth and then covered with a second spirally wound layer 67 of glass fiber mat or cloth; and the whole assembly is impregnated with a polymer-based matrix material 68, which solidifies to form plastic pipe 69. Another use for sheet material of the invention is in lightweight casts. In such uses the sheet material of the invention can be combined with cotton gauze and standard orthopedic plaster to lay up a cast on a body limb.

In a different kind of application, sheet material of the invention is used to make configured surfaces. For example, sheet material prepared by impregnating a matrix material around hollow spheres in sheet material of the invention and solidifying the matrix material may be cut parallel to one large-area face of the sheet material at a depth such that the hollow spheres are cut along approximately their equator. The resulting hemispherical crevices are useful for special reflection purposes (i.e. to direct or distribute the reflection of sound). On the other hand, minimally reflective surface may be formed by using sheet material of the invention which is not impregnated with matrix material but in which the tops of the hollow spheres are removed along a plane so as to form small-diameter openings into the spheres. The resulting surface tends to scatter and trap sound waves directed to the surface, e.g. trapping sound waves that enter through the narrow openings in the spheres, and also those that enter into the spaces between the spheres.

The invention is further illustrated by the following examples.

EXAMPLE 1

Onto a flat 0.3-meter-square, one-centimeter-thick polytetrafluoroethylene-coated sheet of aluminum was laid first a layer of open-mesh nylon scarf material and then a layer of non-woven adhesive web of polyamide fibers ("Bostik" #5230B). Hollow macrospheres having walls filled with microspheres as shown in FIG. 2, and having an average density of 0.25 gram/cubic centimeter and closely screened to have diameters from 1.7 to 2 millimeters, were arranged in a close-packed manner on the adhesive sheet. (In an alternative method, the hollow spheres are closely packed on a smooth board, and the above sheets laid over the spheres in reverse order, after which the complete assembly is turned over so the spheres are on top.) A padding layer of cotton cloth was then placed on top of the macrospheres and a one-centimeter-thick plate of aluminum placed on top. The entire assembly was placed in an oven for 40 minutes at 190° C. and then removed and allowed to cool before disassembly. The resulting sheet material had good strength, yet was open-meshed and very drapeable.

The sheet material was used to fabricate a fiberglass-skinned laminate in the normal layup manner using polyester resin as the matrix material; two different laminates were prepared, one from resin filled with hollow microspheres and one from resin without microspheres.

EXAMPLE 2

Hollow macrospheres having hollow-microsphere-filled walls as shown in FIG. 2, an average density of 0.18 gram/cubic centimeter, and a range in diameter of about 4.8 to 6.4 millimeters were adhered to a carrier web of non-woven polyester fibers using a solid particulate epoxy-based adhesive. The adhesive particles, which ranged from about 100 to 200 micrometers in diameter, were first sifted onto the carrier web, which had been laid on a polytetrafluoroethylene film, and the combination heated sufficiently to tack the adhesive particles to the carrier web. The procedure of Example 1 was then followed. The product was an open-mesh, drapeable space-filling sheet material.

EXAMPLE 3

Example 1 was repeated except that hollow spheres as described in Example 2 were used and the carrier web was a spun-bonded nylon open-mesh fabric weighing 0.3 ounce per square yard (about one milligram/square centimeter) and having an air permeability of 1300 cubic feet per minute per square foot. A space-filling sheet material was obtained having good strength, drapeability, and openness.

A nine-centimeter-diameter pipe section as pictured in FIG. 9 was made with this sheet material by spirally winding on a removable mandrel coated with release agent, first a layer of glass fiber mat, then the sheet material of the example, then another layer of glass fiber mat; and then impregnating the assembly with an epoxy-resin-based composition that was filled with hollow glass microspheres.

EXAMPLE 4

Sheet material like that of Example 3 was prepared except that the filler body was multi-cellular rounded glass nodule (Pittsburgh-Corning's "Celramic" glass spheres) ranging in diameter from about 3.4 to 4 millimeters. The sheet material was similar in properties to the sheet material of Example 3, but compressive strength was 50 percent lower.

EXAMPLE 5

Sheet material like that of Example 1 was prepared except that a non-woven fibrous web was used as the carrier web, and the base plate included a one-millimeter-thick silicone rubber pad between the polytetrafluoroethylene film and the aluminum plate. Use of the rubber pad achieved a partial cupping of the carrier around each hollow macrosphere in the manner shown in FIG. 7, thus resulting in greater flexibility of the sheet material in the direction of the arrow 50 in FIG. 7.

EXAMPLE 6

Sheet material as described in Example 3 was prepared except that the carrier web was a glass-fiber cloth weighing about 2.5 milligrams/square centimeter (M700 from Owens-Corning Fiberglass Company). The resulting sheet material was not as flexible as that prepared according to the previous examples, but was more conformable than a balsa wood sheet of similar thickness, and could be easily used in gentle compound-curve laminates.

EXAMPLES 7 and 8

Example 6 was repeated except that the filler body was multi-cellular rounded glass nodules 3.4 to 4 millimeters in diameter, and in Example 8 the adhesive web was replaced with a glass-forming binder, specifically a mixture of clay particles and liquid sodium silicate having a silica to soda ratio of 3.22 ("N" brand from Philadelphia Quartz). The glass-forming binder was applied manually using a toothpick to the points of contact between the glass nodules and the glass cloth. The assembly was held together until it dried at 150° F. (66° C.), resulting in a weakly bonded, flexible, all-inorganic sheet material.

EXAMPLE 9

Sheet material was made using 7-to-8-millimeter-diameter hollow elastomeric macrospheres (prepared using ground rubber parting agent particles and liquid droplets of polyurethane-forming elastomer precursor). The carrier web was a spun-bonded nylon web weighing about 1 milligram per square centimeter; and the adhesive was a flexible epoxy-based adhesive, which was manually applied with a toothpick at each point of contact between the macrospheres and carrier web. This assembly of materials was covered with a polytetrafluoroethylene film and a flat metal weight to insure contact until the adhesive cured. The result was a drapeable layer of elastomeric spheres, which would be useful, for example, as a carpet backing.

What is claimed is:

1. Sheet material windable into a compact storage roll and adapted to serve as a low-density space-filling strata in a layered structure, comprising a flexible carrier web and, adhered to at least one side of the carrier web, a dense monolayer of uniformly sized discrete filler bodies that have a density of no more than about 0.75 gram/cubic centimeter and are between about 1 and 20 millimeters in average diameter.

2. Sheet material of claim 1 in which the filler bodies have an average density of less than about 0.5 gram/cubic centimeter.

3. Sheet material of claim 1 in which hollow spheres serve as filler bodies.

4. Sheet material of claim 3 in which the walls of said hollow spheres are filled with hollow microspheres.

5. Sheet material of claim 1 in which said carrier web has a porosity sufficient for liquified matrix material to flow through the web.

6. Molded articles comprising sheet material of claim 1 impregnated with solidified polymer-based matrix material.

7. Sheet material windable into a compact storage roll and adapted to serve as a low-density space-filling strata in a layered structure, comprising a porous flexible carrier web and, adhered to at least one side of the carrier web with adhesive means that leaves the carrier web porous, a dense monolayer of uniformly sized discrete hollow spheres that have a density of no more than about 0.75 gram/cubic centimeter and are between about 1 and 20 millimeters in average diameter.

8. Sheet material of claim 7 in which the hollow spheres have an average density of less than about 0.5 gram/cubic centimeter.

9. Sheet material of claim 7 in which the walls of said hollow spheres are filled with hollow microspheres.

10. Sheet material of claim 1 in which said carrier web comprises a non-woven fibrous web.

11. Sheet material of claim 7 in which the carrier web is cupped around a portion of each hollow sphere.

12. Molded articles comprising sheet material of claim 1 impregnated with solidified polymer-based matrix material.

13. Sheet material windable into a compact storage roll and adapted to serve as a low-density space-filling strata in a layered structure, comprising a porous non-woven fibrous flexible carrier web and, adhered to at least one side of the carrier web with adhesive means that leaves the carrier web porous, a dense monolayer of uniformly sized discrete hollow spheres that have walls comprising polymeric material filled with hollow microspheres, have a density of no more than about 0.5 gram/cubic centimeter, and are between about 1 and 10 millimeters in average diameter.

14. Molded articles comprising sheet material of claim 13 impregnated with solidified polymer-based matrix material.

15. Sheet material adapted to serve as a low-density space-filling strata in a layered structure comprising a porous carrier web and, adhered to the web, a dense monolayer of uniformly sized hollow spheres between about 1 and 20 millimeters in average diameter.

16. Sheet material of claim 15 in which the walls of the hollow spheres are filled with hollow microspheres.

17. Sheet material of claim 15 in which the hollow spheres are prepared by
(A) tumbling together and thoroughly mixing (1) solidifiable liquid globules of binder material that contain a source of void-forming agent adapted to evolve as a gas and convert the liquid globules to a hollow condition and (2) a mass of minute discrete free-flowing parting agent particles that are wetted by, and at least partially absorbed into, the liquid globules during the tumbling action; sufficient parting agent particles being present so that any portion of liquid globules uncovered by parting agent particles tumble against discrete unabsorbed parting agent particles;
(B) providing conditions during the tumbling action, and tumbling for a sufficient time, for the void-forming agent to evolve as a gas and form a central interior space within the liquid globules and for the thus-hollowed liquid globules to solidify; and
(C) collecting the converted globules after they have solidified to a shape-retaining condition.

* * * * *